United States Patent
Yoshida et al.

(10) Patent No.: US 12,194,413 B2
(45) Date of Patent: Jan. 14, 2025

(54) METHOD OF ATTACHING/DETACHING CATALYTIC UNIT AND CATALYTIC REACTOR

(71) Applicant: MITSUBISHI HEAVY INDUSTRIES, LTD., Tokyo (JP)

(72) Inventors: Kaori Yoshida, Kanagawa (JP); Rikio Kan, Hyogo (JP); Moritoshi Murakami, Kanagawa (JP); Naoya Matsumoto, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 961 days.

(21) Appl. No.: 16/972,683

(22) PCT Filed: Jul. 8, 2019

(86) PCT No.: PCT/JP2019/027019
§ 371 (c)(1),
(2) Date: Dec. 7, 2020

(87) PCT Pub. No.: WO2020/013134
PCT Pub. Date: Jan. 16, 2020

(65) Prior Publication Data
US 2021/0245099 A1    Aug. 12, 2021

(30) Foreign Application Priority Data
Jul. 13, 2018   (JP) .................... 2018-133341

(51) Int. Cl.
*B01D 53/88* (2006.01)
*B01D 53/86* (2006.01)
(Continued)

(52) U.S. Cl.
CPC ......... *B01D 53/88* (2013.01); *B01D 53/8603* (2013.01); *B01J 19/0006* (2013.01);
(Continued)

(58) Field of Classification Search
None
See application file for complete search history.

(56) References Cited

U.S. PATENT DOCUMENTS 4,322,386 A * 3/1982 Masutomi .............. B01J 15/005
422/171

FOREIGN PATENT DOCUMENTS

| CN | 102807154 A | 12/2012 |
| CN | 204093310 U | 1/2015 |

(Continued)

OTHER PUBLICATIONS

Nagaoka, T. JPH05-285367A—translated document (Year: 1993).*
(Continued)

*Primary Examiner* — Jelitza M Perez
(74) *Attorney, Agent, or Firm* — Osha Bergman Watanabe & Burton LLP

(57) ABSTRACT

A method of attaching/detaching a catalytic unit according to an embodiment is a method of attaching/detaching a catalytic unit accommodated in a reactor housing of a catalytic reactor, including a step of passing the catalytic unit through a gas inlet formed at a top portion of the reactor housing to attach or detach the catalytic unit to or from the reactor housing having a cylindrical shape extending in a vertical direction and configured such that a gas having a gauge pressure of 0.2 Mpa or more is introduced thereto.

1 Claim, 11 Drawing Sheets

(51) Int. Cl.
  *B01J 19/00* (2006.01)
  *B01J 19/24* (2006.01)
  *B01J 35/56* (2024.01)
  *F23J 15/02* (2006.01)

(52) U.S. Cl.
  CPC ........... *B01J 19/2415* (2013.01); *B01J 35/56* (2024.01); *F23J 15/02* (2013.01); *B01D 2255/9155* (2013.01); *B01J 2219/00162* (2013.01); *B01J 2219/185* (2013.01); *B01J 2219/1943* (2013.01); *B01J 2219/328* (2013.01)

(56) References Cited

FOREIGN PATENT DOCUMENTS

| JP | 54065171 | A | * | 5/1979 | ............ B01J 8/0015 |
|----|----------|---|---|--------|--------------------------|
| JP | S54-103775 | A | | 8/1979 | |
| JP | 105-285367 | A | | 11/1993 | |
| JP | 05285367 | A | * | 11/1993 | |
| JP | H05285367 | A | * | 11/1993 | |
| JP | H11-333283 | A | | 12/1999 | |
| JP | 2002-292244 | A | | 10/2002 | |
| JP | 3764568 | B2 | | 4/2006 | |
| JP | 4435964 | B2 | | 3/2010 | |
| JP | 4436005 | B2 | | 3/2010 | |
| JP | 2011-224456 | A | | 11/2011 | |
| JP | 2014-161779 | A | | 9/2014 | |
| JP | 6233545 | B2 | | 11/2017 | |
| JP | 2017214848 | A | * | 12/2017 | ............ B01D 53/94 |

OTHER PUBLICATIONS

Nagaoka, T. JP05285367A—translated document (Year: 1993).*
Harada et al. JP54065171A—translated document (Year: 1979).*
Okazaki et al. JP2017214848A—translated document (Year: 2017).*
International Search Report of PCT/JP2019/027019 dated Aug. 20, 2019 (9 pages).
International Preliminary Report on Patentability mailed on Jan. 28, 2021 in corresponding International (PCT) Application No. PCT/JP2019/027019 (13 pages).
The First Office Action dated Jan. 4, 2022, issued in counterpart Chinese Application No. 201980038734.X (17 pages).
The extended European Search Report dated Jul. 22, 2021, issued to the corresponding EP application No. 19833459.1 (7 pages).

* cited by examiner

A-A

METHOD OF ATTACHING/DETACHING CATALYTIC UNIT AND CATALYTIC REACTOR

TECHNICAL FIELD

The present disclosure relates to a method of attaching/detaching a catalytic unit, and a catalytic reactor.

BACKGROUND

For example, in a denitration device installed in a thermal power plant or the like, a catalyst is placed in a reactor of the denitration device (see Patent Document 1).

Further, for example, in a plant for purifying a syngas obtained by gasification of coal, heavy oil, or the like, a catalyst for converting COS (carbonyl sulfide) of sulfur compounds contained in the syngas into $H_2S$ (hydrogen sulfide) is placed in a reactor (see Patent Document 2).

CITATION LIST

Patent Literature

Patent Document 1: JP445964B
Patent Document 2: JP376456813

SUMMARY

Problems to be Solved

In the denitration device disclosed in Patent Document 1, a catalyst having a honeycomb structure with a plurality of axially extending passages is used.

The denitration device disclosed in Patent Document 1 includes a catalytic unit packed with a plurality of catalysts having a honeycomb structure, and the catalysts are replaced for each catalytic unit at the maintenance of the denitration device.

By using the catalyst having a honeycomb structure, the contact efficiency between the exhaust gas and the catalyst is increased, so that the denitration can be efficiently performed.

Therefore, for example in the plant for purifying syngas disclosed in Patent Document 2, it is conceivable to use the catalyst having a honeycomb structure as a catalyst for converting COS to $H_2S$ in order to improve the efficiency of converting COS to I-12S.

When the catalyst having a honeycomb structure is used as the catalyst for converting COS to $H_2S$ for example in the plant disclosed in Patent Document 2, at the time of maintenance, as in the denitration device disclosed in Patent Document 1, the catalyst may be replaced for each catalytic unit, and the catalytic unit may be inserted or removed through an opening of the reactor.

In the plant disclosed in Patent Document 2 for example, the pressure of the syngas introduced into the reactor for converting COS into $H_2S$ is, for example, about 2 to 4 MPa in terms of gauge pressure. Accordingly, in the reactor, for ensuring the strength, it is desirable that the opening area of the opening is as small as possible, and that the number of openings is as small as possible.

When there is a constraint on the opening provided in the container, there is a problem as to the opening through which the catalytic unit is inserted and removed becomes an issue.

In view of the above, an object of at least one embodiment of the present invention is to provide a method of inserting and removing a catalytic unit into/from the container when the container has a constraint on the opening.

Solution to the Problems (1) A method of attaching/detaching a catalytic unit according to an embodiment is a method of attaching/detaching a catalytic unit accommodated in a reactor housing of a catalytic reactor, including a step of passing the catalytic unit through a gas inlet formed at a top portion of the reactor housing to attach or detach the catalytic unit to or from the reactor housing having a cylindrical shape extending in a vertical direction and configured such that a gas having a gauge pressure of 0.2 Mpa or more is introduced thereto.

With the above method (1), since the catalytic unit is passed through the gas inlet formed at the top portion of the reactor housing, the catalytic unit can be inserted to and removed from the reactor housing without additionally providing an opening allowing the catalytic unit to pass in the reactor housing. Therefore, even there is a constraint on the opening provided in the reactor housing from the viewpoint of ensuring strength, for example like a reactor housing configured so that a gas having a gauge pressure of 0.2 MPa or more is introduced thereto, the catalytic unit can be inserted into and removed from the reactor housing.

(2) In some embodiments, in the above method (1), the inlet has a circular shape, the catalytic unit has a quadrangular prism shape, and a diagonal dimension of the catalytic unit in a cross-section perpendicular to an extending direction of the quadrangular prism shape is smaller than an inner diameter of the inlet.

With the above configuration (2), the catalytic unit of quadrangular prism shape can pass through the inlet.

(3) some embodiments, the above method (1) or (2) further comprises a step of attaching/detaching a seal plate for sealing between an outer periphery of an upper portion of a casing of the catalytic unit and an inner periphery of the reactor housing when the catalytic unit is attached to or detach from the reactor housing.

With the above method (3), since the seal plate is also attached or detach when the catalytic unit is attached to or detach from the reactor housing, the catalytic unit can be easily attached or detached.

(4) In some embodiments, the above method (3) further comprises a step of passing the seal plate divided into a plurality of segments through the inlet.

With the above method (4), since the seal plate is passed through the inlet in the divided state, even the seal plate whose size before division is larger than the size of the inlet can be inserted and removed from the reactor housing.

(5) In some embodiments, any one of the above methods (1) to (4) further comprises a step of moving the catalytic unit by using a hoisting device suspended from a hanger disposed inside the catalytic reactor.

With the above method (5), the catalytic unit can be easily moved inside the catalytic reactor, so that the attachment and detachment of the catalytic unit can be efficiently performed.

(6) In some embodiments, in the above method (5), the step of moving the catalytic unit by using the hoisting device includes moving the catalytic unit suspended by an external lifting device which lifts and lowers the catalytic unit from an outside of the reactor housing, in a radial direction of the reactor housing, by using the hoisting device suspended from the hanger that is disposed radially outward of the inlet.

When the catalytic unit is attached to or detached from the reactor housing by inserting or removing the catalytic unit through the inlet formed at the top portion of the reactor housing, the catalytic unit is moved between the inlet and the installation position of the catalytic unit while the catalytic unit is suspended by the lifting device, such as a crane, disposed outside the reactor. In this case, if the position of the inlet formed at the top portion of the reactor housing is displaced from the installation position of the catalytic unit to be attached or detached in the radial direction of the inlet (radial direction of reactor housing), it is necessary to move the catalytic unit inside the reactor housing in the radial direction of the reactor housing.

In this regard, with the above method (6), even if the position of the inlet formed at the top portion of the reactor housing is displaced from the installation position of the catalytic unit to be attached or detached ire the radial direction, by using the hoisting device suspended from the hanger disposed outward of the inlet in the radial direction of the reactor housing, the catalytic unit can be easily moved in the radial direction of the reactor housing. Thus, the attachment and detachment of the catalytic unit can be efficiently performed.

(7) in some embodiments, in the above method (6), in a case of installing the catalytic unit inside the reactor housing, the step of moving the catalytic unit by using the hoisting device includes moving the catalytic unit radially outward from a position vertically below the inlet by operating the external lifting device and the hoisting device in conjunction with other.

With the above method (7), by operating the external lifting device such as a crane and the hoisting device suspended from the hanger inside the reactor housing in conjunction with each other, the catalytic unit can be easily moved in the radial direction of the reactor housing. Thus, the attachment and detachment of the catalytic unit can be efficiently performed.

(8) A catalytic reactor according to at least one embodiment of the present invention comprises: a reactor housing having a cylindrical shape extending in a vertical direction, the reactor housing being configured such that a gas having a gauge pressure of 0.2 Mpa or more is introduced into the reactor housing, the reactor housing having an inlet for the gas at a top portion, the reactor housing accommodating the catalytic unit, and a hanger disposed, inside the reactor housing, above the catalytic unit, and radially outward of the inlet in a radial direction of the reactor housing.

With the above method (8), by suspending the hoisting device such as a chain block from the hanger and using this hoisting device, the catalytic unit can be easily moved in the radial direction of the reactor housing. Thus, when the catalytic unit is attached or detached, the attachment and detachment can be efficiently performed.

(9) In some embodiments, in the above configuration (8), the hanger is disposed at a top portion of the reactor housing and at a peripheral wall of the reactor housing.

With the above configuration (9), the installation position of the hanger disposed at the top portion of the reactor housing and the installation position of the hanger disposed at the peripheral wall of the reactor housing are different in the radial direction of the reactor housing. By appropriately using the hangers disposed at different positions in the radial direction of the reactor housing, the catalytic unit can be easily moved in the radial direction of the reactor housing. Thus, when the catalytic unit is attached or detached, the attachment and detachment can be efficiently performed.

Advantageous Effects

According to at least one embodiment of the present invention, it is possible to easily insert and remove the catalytic unit into/from the container even when the container has a constraint on the opening.

DETAIL DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction" "parallel", "orthogonal", "centered" "concentric" "and" "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
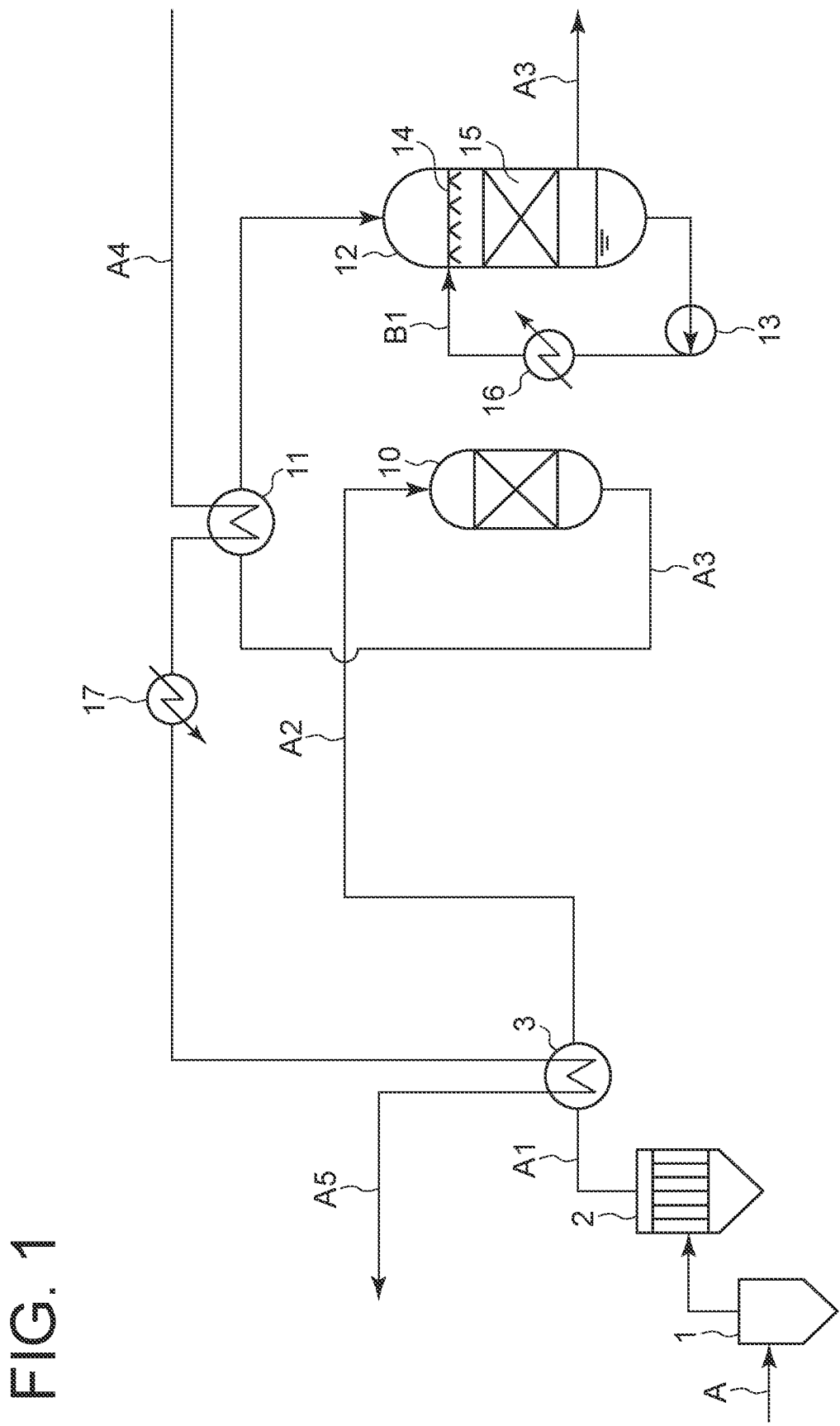
FIG. 1 is a diagram showing an example of a plant including a catalytic reactor to which the method of attaching/detaching a catalytic unit according to some embodiments is applied.

FIG. 1 is a diagram showing an example of a plant including a catalytic reactor to which the method of attaching/detaching a catalytic unit according to some embodiments is applied, and shows a configuration of a pretreatment part which is a part of a gas purification plant.

The gas purification plant of FIG. 1 is a plant for purifying a syngas obtained by gasifying coal as a raw material.

In a gasifier (not depicted), for example, coal is gasified by using air or oxygen as a gasifying agent to produce a syngas A mainly composed of carbon monoxide and hydrogen. The syngas A obtained by using coal as a raw material and air or oxygen as a gasifying agent usually contains about 1000 to 1500 ppm of $H_2S$ (sulfur compound) and about 100 to 1000 ppm of COS (sulfur compound).

As shown in FIG. 1, the syngas A is first introduced into a cyclone 1 and a porous filter 2 in this order to separate and remove dust having a relatively large diameter and fine dust.

A heat exchanger 3 (re-heater heat exchanger) is disposed downstream of the porous filter 2, in which a purified gas A4 is heated by heat of the gas A1 from the porous filter 2 and is discharged as a gas A5. On the other hand, the gas A1 loses heat and is cooled by the heat exchanger 3.

A catalytic reactor 10 packed with a catalyst for converting COS to $H_2S$ is disposed downstream of the heat exchanger 3. Most of COS in the syngas A2 cooled by the heat exchanger 3 is converted into HS by the catalytic reactor 10 and, the gas is discharged as a gas A3 containing almost no COS.

A heat exchanger 11 (pre-heater heat exchanger) is disposed downstream of the catalytic reactor 10, in which the purified gas A4 is heated by heat of the gas A3 from the catalytic reactor 10. The gas A3 loses heat and is cooled by the heat exchanger 11.

A cooling tower 12 is disposed downstream of the heat exchanger 11, in which the gas A3 comes into gas-liquid contact with a cooling liquid B1 before the gas is introduced to a desulfurization part (not shown) described later.

The cooling tower 12 is a so-called packed gas-liquid contact tower, in which the cooling liquid B1 mainly composed of water and stored in the bottom of the tower is drawn by a circulation pump 13 and sprayed from a spray pipe 14 at the top of the tower, and while flowing downward through a packing material 15, comes into gas-liquid contact with the gas A3 and returns to the bottom of the tower to circulate through the tower.

The circulation line of the circulation pump 13 is provided with a cooler 16 for cooling the cooling liquid B1 using industrial water as a refrigerant, by which heat of the gas A3 is indirectly recovered. Further, in the cooling tower 12, the gas A3 is cooled by contact with the cooling liquid B.

Further, the pre-treatment part of the example shown in FIG. 1 has, in addition to the heat exchanger 11, a heater 17 as pre-treatment means of the present invention. The heater 17 is disposed downstream of the heat exchanger 11 on the discharge line of the purified gas A4 to further heat the gas A4 by heat energy of high temperature steam or the like supplied from outside the system shown in FIG. 1.

In the desulfurization part (not shown), the gas A3 cooled by the cooling tower 12 is brought into gas-liquid contact with an absorbing liquid to remove $H_2S$ from the gas A3. The gas A4 from which $H_2S$ has been removed is heated by the heat exchanger 11, the heater 17, and the heat exchanger 3 and becomes the treated gas A5. The treated gas A5 is supplied to, for example, a gas turbine of a combined power generation system.

In the gas purification plant described above, the pressure of the syngas A2 introduced into the catalytic reactor 10 is, for example, about 2 to 4 Mpa in terms of gauge pressure. Therefore, the catalytic reactor 10 according to some embodiments receives about 2 to 4 Mpa of gauge pressure as internal pressure. Accordingly, in the catalytic reactor 10, for ensuring the strength of the catalytic reactor 10, it is desirable that the opening area of the opening is as small as possible, and that the number of openings is as small as possible. Hereinafter, the structure of the catalytic reactor 10 according to some embodiments will be described.

Figure 2:
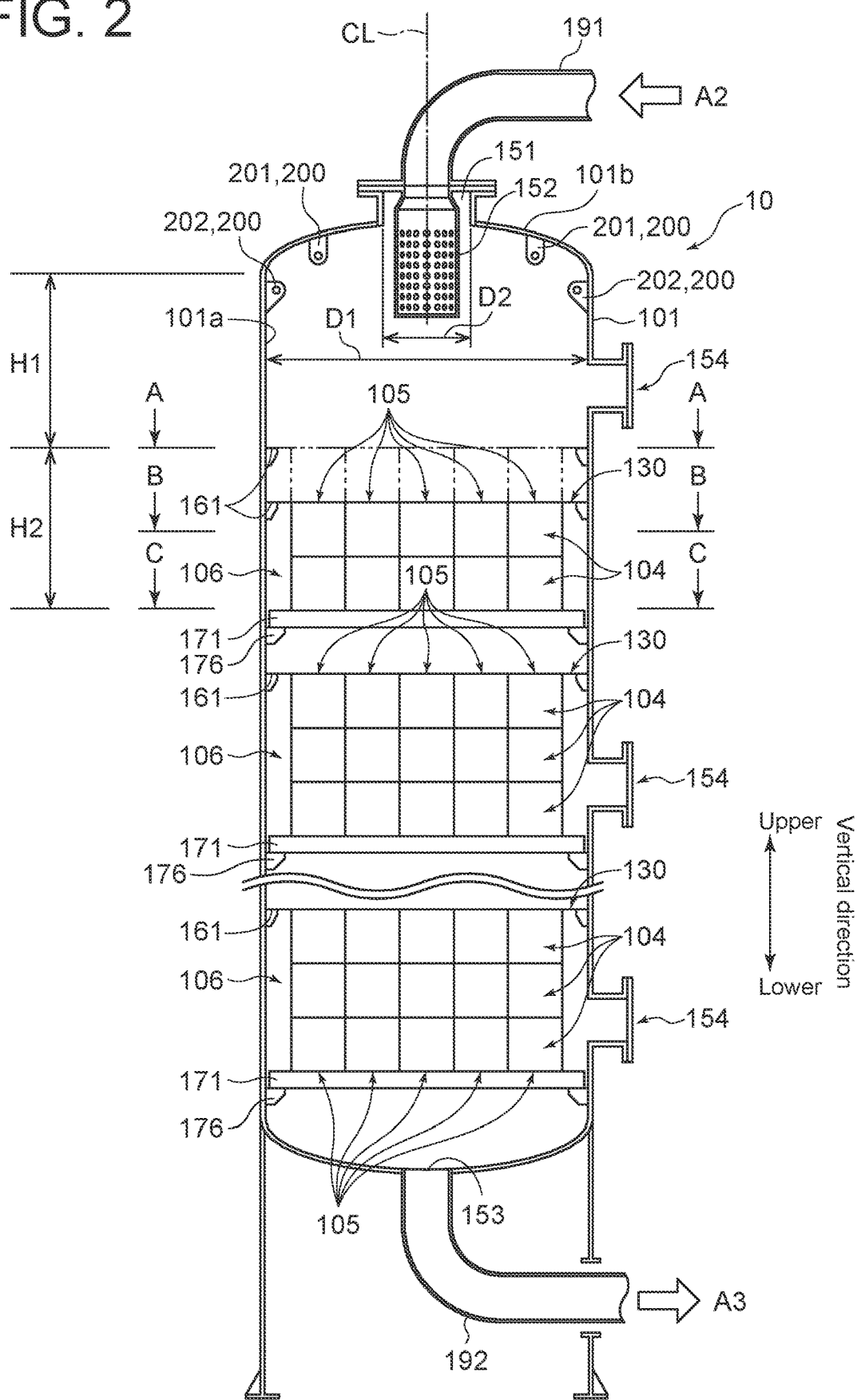
FIG. 2 is a diagram showing a schematic structure of a catalytic reactor according to some embodiments.
Figure 3:
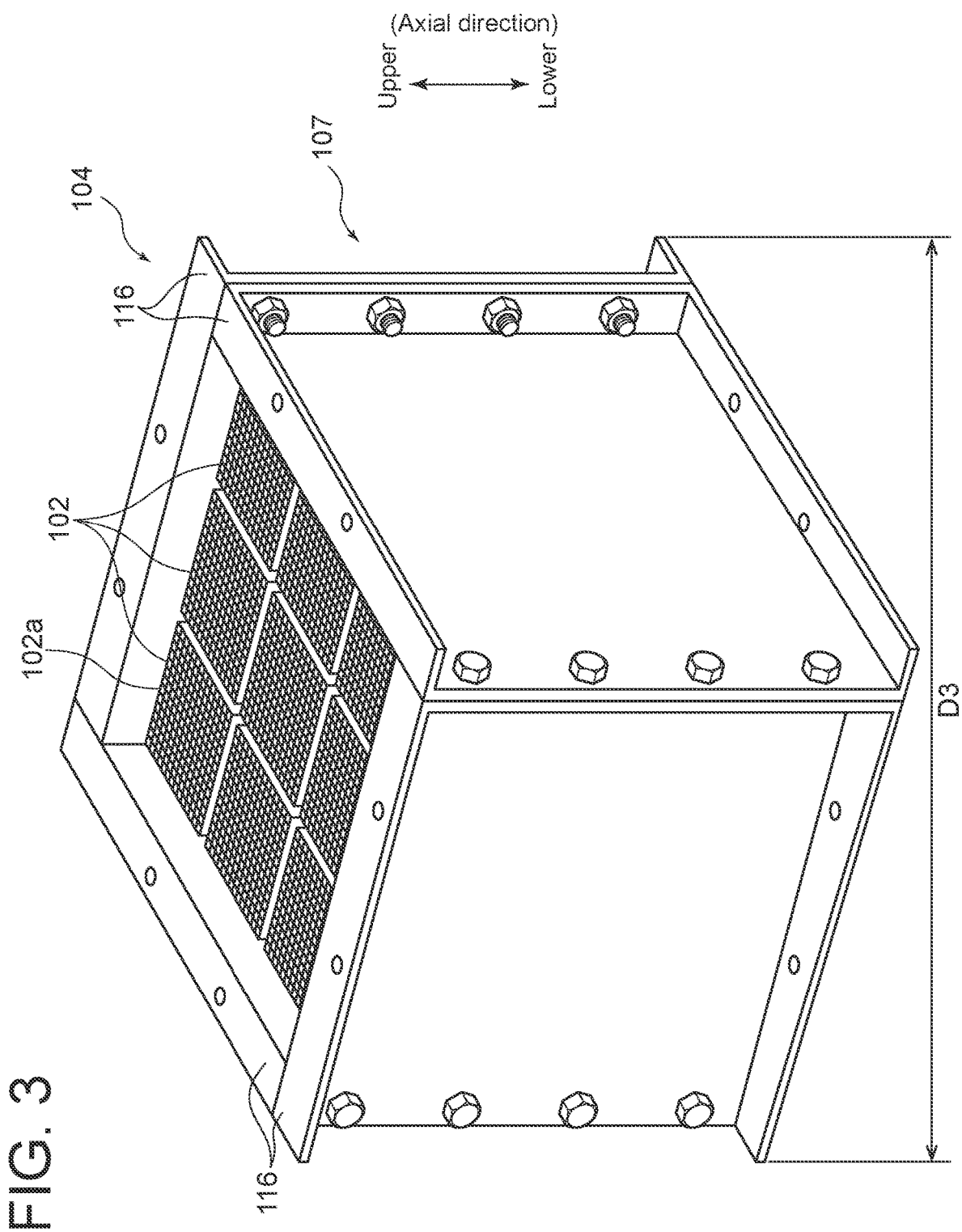
FIG. 3 is a schematic perspective view of a catalytic unit.
Figure 4:
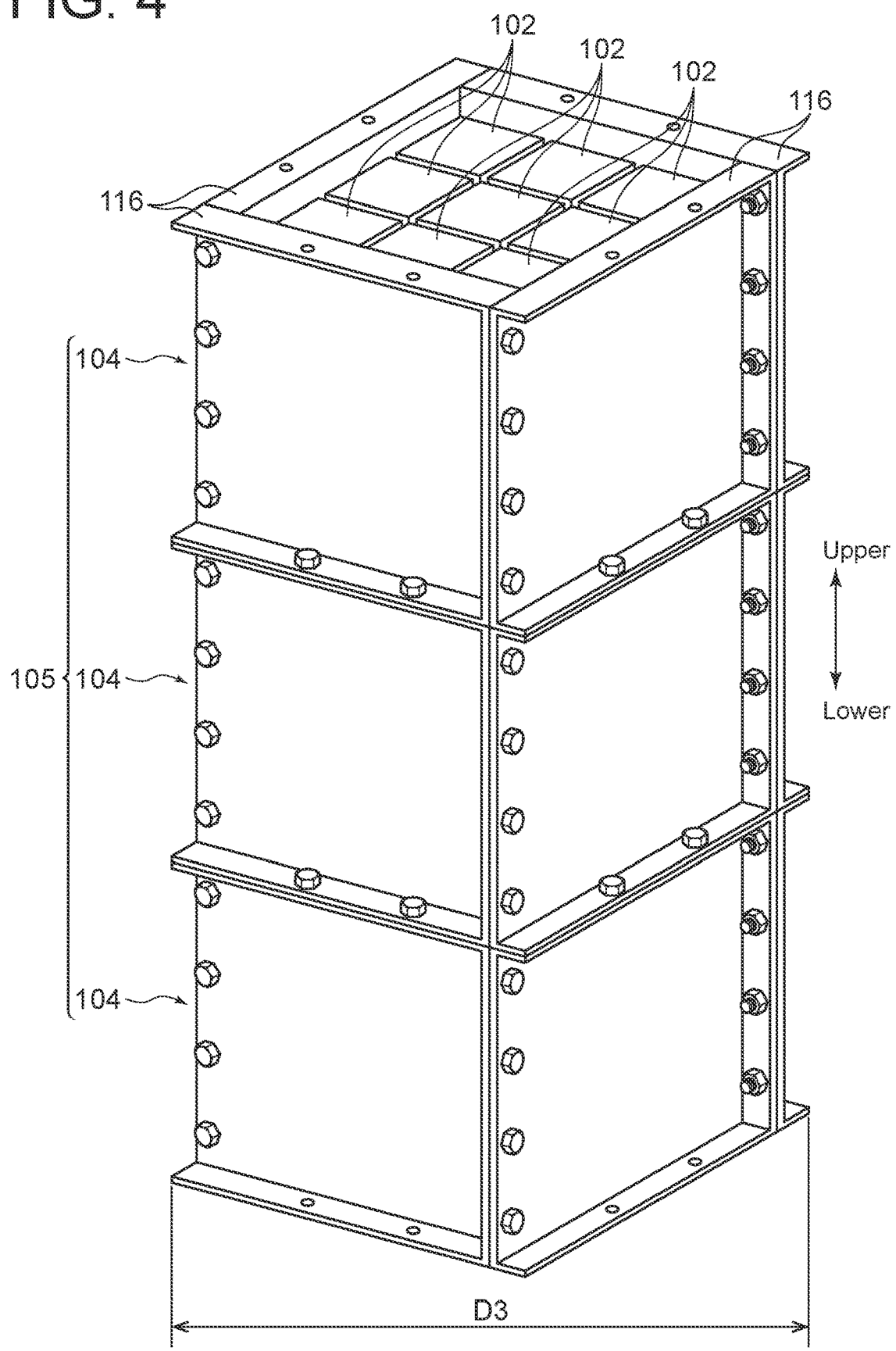
FIG. 4 is a schematic perspective view of a connected body in which catalytic units are connected.
Figure 5:
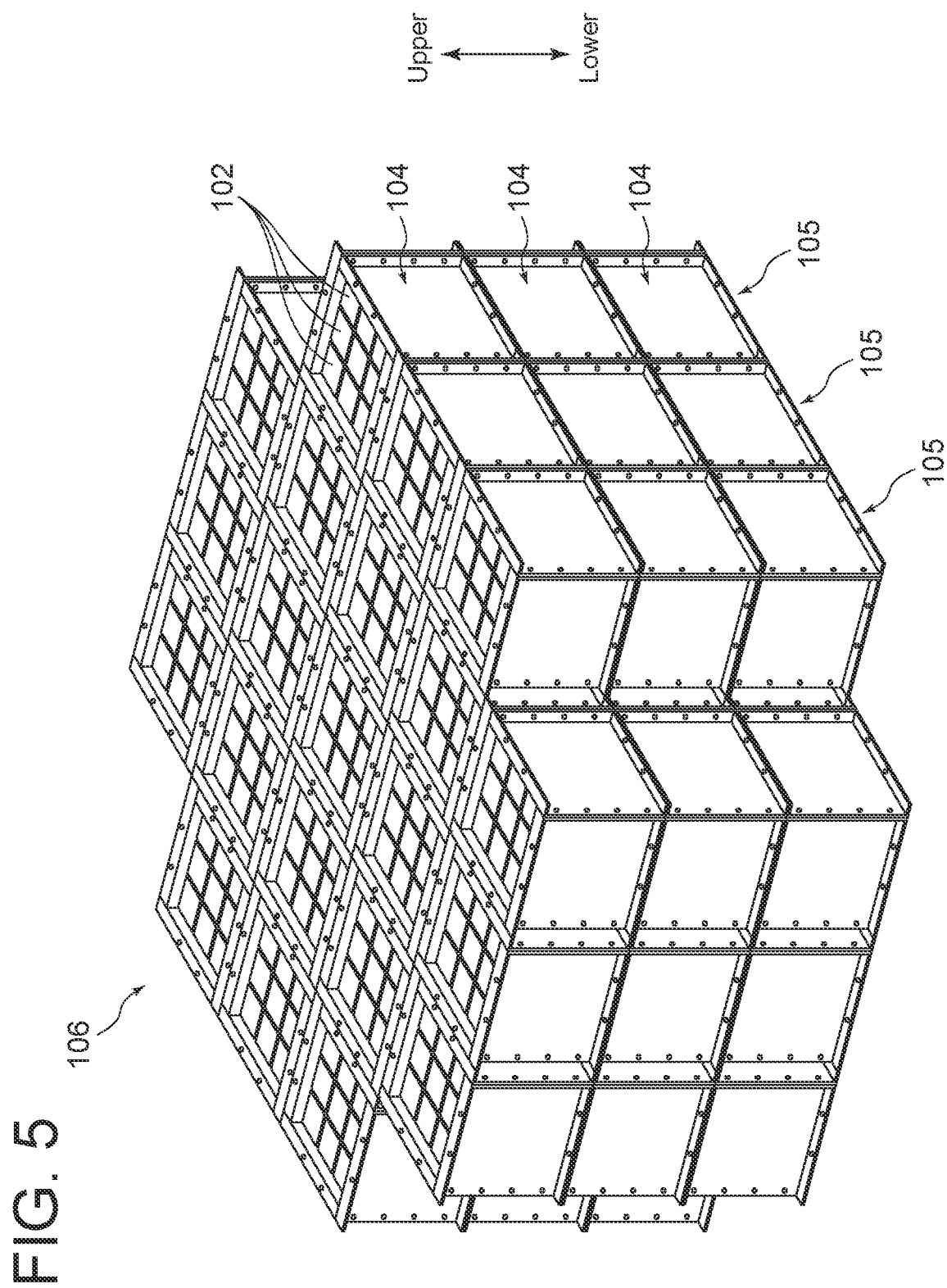
FIG. 5 is a perspective view of a conversion part which connected bodies arranged in a grid shape.

FIG. 2 is a diagram showing a schematic structure of a reactor 10 according to some embodiments. FIG. 3 is a schematic perspective view of a catalytic unit 104. FIG. 4 is a schematic perspective view of a connected body 105 in which catalytic units 104 are connected. FIG. 5 is a perspective view of a conversion part 106 in which connected bodies 105 are arranged a grid shape.

The catalytic reactor 10 according to some embodiments includes a reactor housing 101 having a cylindrical shape extending in the vertical direction, and a catalytic unit 104 (see FIG. 3) including a catalyst 102 having a honeycomb structure in which a plurality of passages extending in the axial direction are formed.

Herein, the axial direction indicates an extending direction of passages (cells) 102a (see FIG. 3) of the catalyst 102 having a honeycomb structure. In some embodiments, as described later, the catalyst 102 is arranged in the reactor housing 101 so that the extending direction of the passages 102a coincides with the main flow direction of the gas in the reactor housing 101. Accordingly, in some embodiments, when the catalyst 102 is arranged in the catalytic reactor 10, the axial direction is the same as the extending direction of the reactor housing 101 of cylindrical shape, i.e., the vertical direction. For convenience of description, the upper-lower direction is defined as shown in each figure. When constituent members of the catalytic reactor 10 shown in each figure are arranged in the catalytic reactor 10, the upper-lower direction defined in each figure is the same as the vertical direction.

As shown in FIG. 2, in the catalytic reactor 10 according to some embodiments, a gas inlet (inlet opening) 151 is provided in an end plate portion 101b at the top of the reactor housing 101. In the catalytic reactor 10 according to some embodiments, the inlet opening 151 is a circular opening coaxial with the central axis CL of the reactor housing 101 having a cylindrical shape.

In the catalytic reactor 10 according to some embodiments, an introduction pipe 191 for the syngas A2 is connected to the inlet opening 151 at the top of the reactor housing 101. The syngas A2 containing COS is introduced into the reactor housing 101 through the inlet opening 151.

The downstream end of the introduction pipe 191 is connected to a flow straightener 152 for suppressing the uneven inflow of the syngas A2 into the conversion part 106. The flow straightener 152 has, for example, a bottomed cylindrical shape, and the cylindrical portion has openings for ejecting the syngas A2 fed to the inner periphery.

The syngas A2 introduced into the reactor housing 101 through the flow straightener 152 flows from above to below through multiple stages of the conversion parts 106 described later, so that COS contained in the syngas A2 is converted into $H_2S$ by the catalysts 102.

In the catalytic reactor 10 according to some embodiments, a discharge pipe 192 for the syngas A2 is connected to a gas outlet (outlet opening) 153 at the bottom of the reactor housing 101.

The gas A3 containing $H_2S$ converted from COS by the conversion part 106 is discharged to the discharge pipe 192 through the outlet opening 153.

In the catalytic reactor 10 according to seine embodiments, a manhole 154 is provided in the cylindrical portion of the reactor housing 101.

In the catalytic reactor 10 according to some embodiments, a hanger 200 is attached, above the catalytic unit 104 arranged in the reactor housing 101, outward of the inlet opening 151 in the radial direction of the reactor housing 101, Specifically, the hanger 200 includes a first hanger 201 attached to the top portion of the reactor housing 101, and a second hanger 202 attached to the peripheral wall (inner peripheral surface 101a) of the reactor housing 101.

In a region, of the end plate portion 101b at the top of the reactor housing 101, outward of the inlet opening 151 in the radial direction of the reactor housing 101, a plurality of first hangers 201 are attached at intervals in the circumferential direction.

In the vicinity of the upper end of the inner peripheral surface 101a of the cylindrical portion of the reactor housing 101, a plurality of second hangers 202 are attached at intervals in the circumferential direction.

When the circumferential position at which the first hanger 201 is attached to the reactor housing 101 differs from the circumferential position at which the second hanger 202 is attached to the reactor housing 101, as described later, when the catalytic unit 104 (connected body 105) is moved into any position in the horizontal direction in the reactor housing 101, the catalytic unit 104 (connected body 105) can be easily moved.

Figure 11:
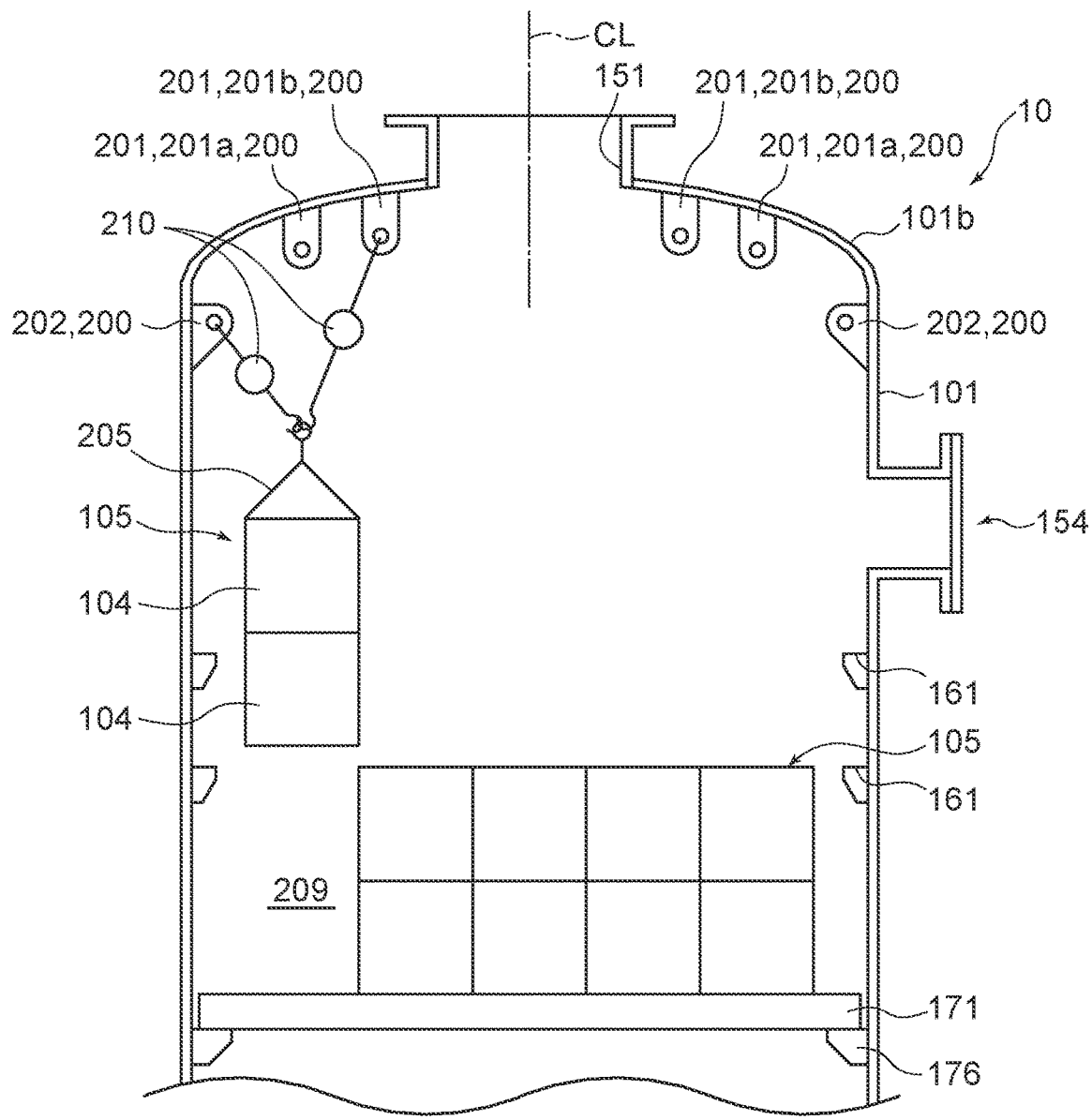
FIG. 11 is a diagram for describing the moving step and lifting/lowering step.

In addition, for example as shown in FIG. 11 described later, the first hanger 201 may be further provided in a different position in the radial direction. In other words, the first hanger 201 may include a plurality of first hangers 201a disposed along a first virtual circumference (not shown) centered at the central axis CL of the reactor housing 101 and a plurality of first hangers 201b disposed along a second virtual circumference (not shown) centered at the central axis CL of the reactor housing 101 and having a different radius from the first circumference. In this case, if the plurality of first hangers 201a disposed along the first circumference and the plurality of first hangers 201b disposed along the second circumference are at different circumferential positions, the catalytic unit 104 (connected body 105) can be easily moved into any position in the horizontal direction in the reactor housing 101.

The second hanger 202 may not necessarily be provided.

As shown in FIG. 3, the catalytic unit 104 according to some embodiments has a quadrangular prism shape extending in the axial direction. In the catalytic, unit 104 according to some embodiments, the dimension in the diagonal direction (diagonal dimension) D3 of the catalytic unit in a cross-section perpendicular to the axial direction of the quadrangular prism shape is smaller than the inner diameter D2 of the inlet opening 151. Accordingly, as described later, the catalytic unit 104 can pass through the inlet opening 151.

The catalytic unit 104 according to some embodiments includes at least one catalyst 102. In the example shown in FIG. 3, the catalyst 102 has a quadrangular prism shape extending in the axial direction, in the same direction as the extending direction of the passages 102a of the catalyst 102. In the example shown in FIG. 3, the catalyst 102 has a regular quadrangular prism shape with opposite square end surfaces, but the catalyst 102 may not necessarily have a regular quadrangular prism shape.

In the example shown in FIG. 3, the catalytic unit 104 includes, for example, nine catalysts 102. In the catalytic unit 104 according to some, embodiments, the nine catalysts 102 is integrally held by a casing 107. In the catalytic unit 104 according to some embodiments, the catalysts 102 are accommodated in the catalytic unit 104 such that the axial direction of the catalysts coincides Leith the extending direction (upper-lower direction) of the rectangular tube of the casing 107.

As shown in FIG. 4, in the catalytic reactor 10 according to some embodiments, a plurality of catalytic units 104 are connected in the upper-lower direction to form a connected body 105. Further, as shown in FIG. 5, in the catalytic reactor 10 according to some embodiments, a plurality of connected bodies 105 shown in FIG. 4 are arranged in a grid shape in a direction perpendicular to the upper-lower direction (axial direction) to form a conversion part 106.

Figure 6:
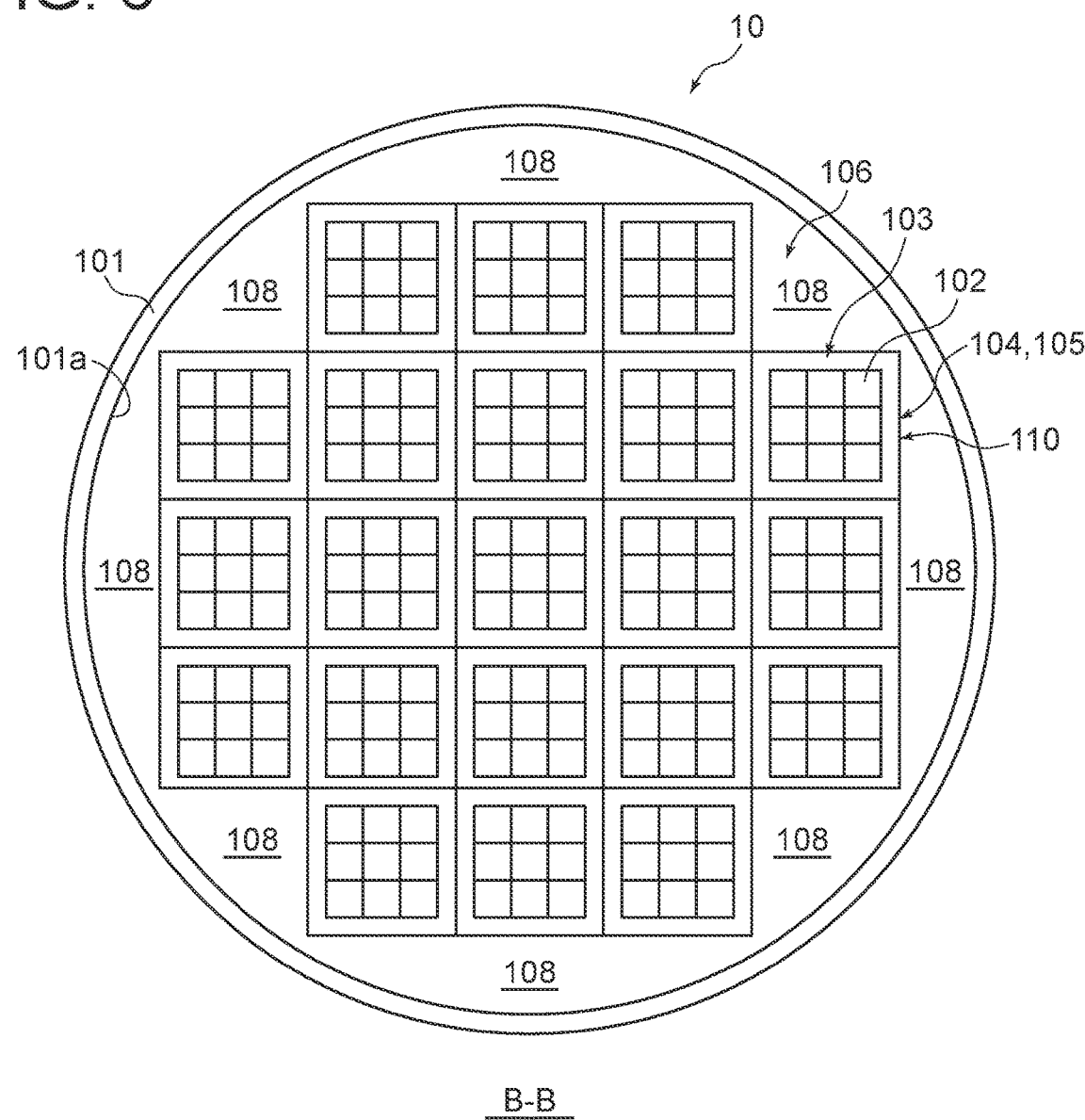
FIG. 6 is a cross-sectional view taken along line B-B in FIG. 2.

FIG. 6 is a cross-sectional view taken along line B-B in FIG. 2 and schematically shows the arrangement of the catalytic units 104 (connected bodies 105) in the reactor housing 101.

As shown in FIG. 2, in the catalytic reactor 10 according to some embodiments, the conversion part 106 is arranged in the reactor housing 101 such that the upper-lower direction of the connected bodies 105 coincides with the vertical direction. In the catalytic reactor 10 according to some embodiments, a plurality of conversion parts 106 are arranged apart from each other in the vertical direction inside the reactor housing 101.

As described above, the catalysts 102 are accommodated in the catalytic unit 104 such that the axial direction of the catalysts coincides with the upper-lower direction of the catalytic unit 104. Further, the conversion part 106 is arranged inside the reactor housing 101 such that the upper-lower direction of the connected bodies 105, each of which is formed by connecting the catalytic units 104 in the upper-lower direction, coincides with the vertical direction. Accordingly, the catalytic unit 104 is accommodated in the reactor housing 101 such that the axial direction, which coincides with the extending direction of the passages 102a of the catalyst 102, is aligned with the vertical direction.

In such a catalytic reactor 10 according to some embodiments, for example, if there is a gap between the outer periphery of the catalytic unit 104 and the inner periphery (inner peripheral surface 101a) of the reactor housing 101, the syngas A2 bypasses the catalysts 102 through the gap, so that the syngas A2 cannot be efficiently brought into contact with the catalysts 102.

Therefore, the catalytic reactor 10 according to some embodiments includes a seal plate 130 sealing between the outer periphery of an upper portion of the casing 107 of the catalytic unit 104 and the inner periphery of the reactor housing 101, In the catalytic reactor 10 according to some embodiments, the seal plate 130 seals between the outer periphery of the catalytic unit 104 and the inner periphery of the reactor housing 101 at an upstream end portion of the catalytic unit 104 with respect to the flow of a fluid (syngas A2) flowing in the reactor housing 101.

Thus, since the seal plate 130 suppresses the bypassing flow of the syngas A2 through a gap between the outer periphery of the catalytic unit 104 and the inner periphery of the reactor housing 101, it is possible to efficiently bring the fluid into contact with the catalyst 102.

(Seal Plate 130)

The seal plate 130 will now be described.

Figure 7:
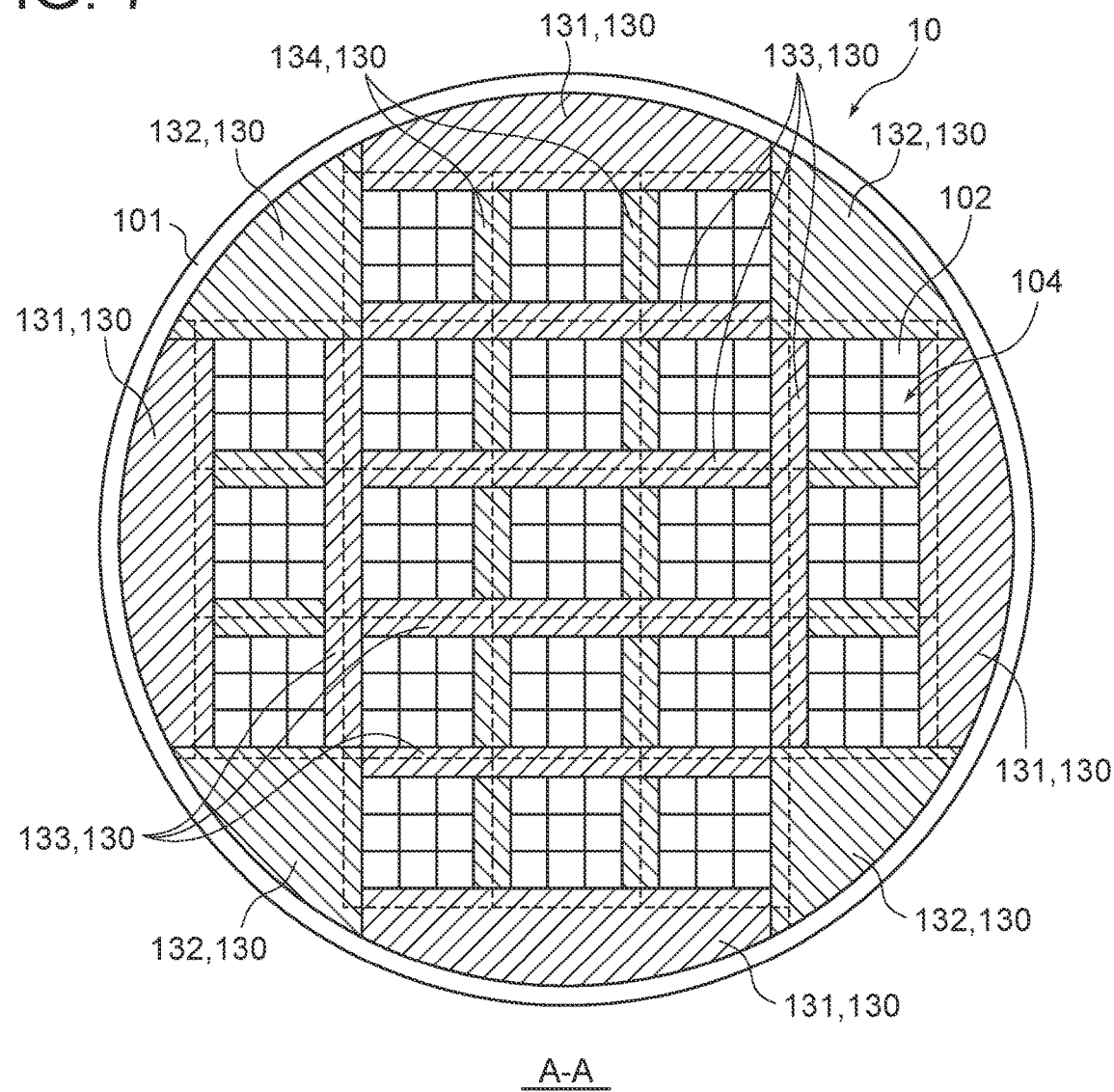
FIG. 7 is a cross-sectional view taken along line A-A in FIG. 2.

FIG. 7 is a cross-sectional view taken along line A-A in FIG. 2. In some embodiments, as shown in FIG. 7, the seal plate 130, namely a first seal plate 131 and a second seal plate 132 which will be described later, is fixed to the reactor housing 101 and the casing 107 of an outermost peripheral catalytic unit 104 of the plurality of catalytic units 104.

Specifically, for example, a support ring 161 (see FIG. 2) for fixing the seal plate 130 is attached to the inner peripheral surface 101a of the reactor housing 101. The support ring 161 is a plate-like member having an annular shape, and a nut (not shown) is fixed to the lower surface thereof by, for example, welding.

The seal plate 130 is placed on the upper surface of the support ring 161 and the upper surface of the upper flange portion 116 of the casing 107 of the catalytic unit 104. The seal plate 130 is fixed to the upper surface of the support ring 161 with a bolt (not shown) by fastening the bolt to a nut (not shown) on the lower surface of the support ring 161, for example. Further, the seal plate 130 is fixed to the upper surface of the upper flange portion 116 with a bolt by fastening the bolt to a nut (not shown) fixed to the lower surface of the upper flange portion 116 of the casing 107 of the catalytic unit 104.

In some embodiments, the seal plate 130 is divided into several parts. For example, the seal plate 130 includes a first seal plate 131 having a substantially arcuate shape, a second seal plate 132 having a substantially triangular shape in which one of three sides has an arc shape, and a third seal plate 133 and a fourth seal plate 134 having a rectangular shape.

In some embodiments, in the conversion part 106, the catalytic units 104 are arranged in a grid pattern, for example, with 5 rows and 5 columns excluding the four corners, i.e., 21 places except the 1st row and 1st column, 1st row and 5th column, 5th row and 1st column, and 5th row and 5th column. For example, the first seal plate 131 is configured to seal a gap 108 between the reactor housing 101 and three catalytic units 104 arranged linearly at the outermost peripheral position among the catalytic units 104 arranged at 21 places in a grid pattern with 5 rows and 5 columns excluding the four corners.

The second seal plate 132 is configured to seal a gap 108 between the reactor housing 101 and catalytic units 104 arranged at the position corresponding to the four corners of the pattern of 5 rows and 5 columns, for example.

For example, the third seal plate 133 and the fourth seal plate 134 are configured to seal a gap between two adjacent catalytic units 104. For example, the third seal plate 133 is configured such that one third seal plate 133 seals a gap between linearly arranged three catalytic units 104 and another linearly arranged three catalytic units 104 adjacent thereto. For example, the fourth seal plate 134 is configured to seal a gap between two adjacent catalytic units 104 other than a region where the first seal plate 131 to the third seal plate 133 seal. The third seal plate 133 and the fourth seal plate 134 also serve to connect adjacent catalytic units 104 (connected bodies 105) to each other at the upper end. The third seal plate 133 and the fourth seal plate 134 are fixed to the upper surface of the upper flange portion 116 of the casing 107 of each of the adjacent catalytic units 104 with a bolt (not shown).

Thus, in some embodiments, since the seal plate 130 is fixed to the reactor housing 101 and the casing 107 of the outermost peripheral catalytic unit 104 of the plurality of catalytic units 104, it is possible to improve the sealing effect of the seal plate 130 on the syngas A2.

In some embodiments, as described above, at least two casings 107 arranged in the upper-lower direction are connected to each other to form a connected body 105 of the catalytic units 104. In some embodiments, the upper end portion of the connected body 105, i.e., the upper surface of the upper flange portion 116 of the casing 107 of the uppermost catalytic unit 104 of the connected body 105, is fixed to the reactor housing 101 via the seal plate 130 (first seal plate 131 and second seal plate 132).

Further, as shown in FIG. 2, in some embodiments, the lower end portion of the connected body 105 (conversion part 106) is supported from below by a support member 171 fixed to the reactor housing 101.

Thereby, it is possible to reduce the number of upper fixing points and the number of lower supporting points of the catalytic units 104, for example, compared with the case where each of the catalytic units 104 arranged in the upper-lower direction is fixed to the reactor housing 101 via the seal plate 130 and supported by the support member 171 from below without forming the connected body 105.

In some embodiments, as shown in C. 2, a plurality of connected bodies 105 are arranged apart from each other in the upper-lower direction. Further, the upper end portion of each of the connected bodies 105 is fixed to the reactor housing 101 via the seal plate 130, and the lower end portion of each of the connected bodies 105 is supported from below by the support member 171 fixed to the reactor housing 101.

Thus, since the upper end portion of each of the connected bodies 105 arranged apart from each other in the upper-lower direction is separately fixed to the reactor housing 101, it is possible to stabilize the posture of each connected body 105. Further, since each of the connected bodies 105 arranged apart from each other in the upper-lower direction is separately supported from below by the support member 171, it is possible to reduce the load applied to each connected body 105 and disperse the load applied by the connected bodies 105 to the reactor housing 101, compared with the case where the connected bodies 105 are further connected in the upper-lower direction and the lowermost connected body 105 is supported by the support member 171.

In some embodiments, the seal plate 130 is fixed to an upper part of the connected body 105 to restrict the horizontal movement of the connected body 105 via the seal plate 130, Further, in some embodiments, the lower end of the connected body 105 is supported by the support member 171 to disperse the load of the connected body 105 and the downward force applied by the syngas A2 to the connected body 105 during operation of the plant by the support member 171. Thus, in some embodiments, the seal plate 130 has a function of restricting horizontal movement of the connected body 105 and a function of sealing the gap 108, while the support member 171 has a function of bearing the load for example acting on the connected body 105, That is, the structure of the seal plate 130 can be simplified by causing the support member 171 to bear the vertical force acting on the connected body 105.

The support member 171 is a beam-like member and is detachably fixed to, for example, a support lug 176 fixed to the inner peripheral surface 101a of the reactor housing 101. Each connected body 105, i.e., each conversion part 106 is placed on the upper surface of the support member 171 and is supported at the lower end by the support member 171.

(Number of Connected Catalytic Units 104 of Connected Body 105)

As shown in FIG. 2, in the catalytic reactor 10 according to some embodiments, except the uppermost conversion part 106, the connected body 105 includes three catalytic units 104 connected in the upper-lower direction. However, the number of connected catalytic units 104 of the connected body 105 is not limited to three but may be two. Hereinafter, the number of connected catalytic units 104 of the connected body 105 is also simply referred to as connection number.

In the catalytic reactor 10 according to some embodiments, in the uppermost conversion part 106, the connected body 105 includes two catalytic units 104 connected in the upper-lower direction. However, the connection number in the uppermost conversion part 106 is not limited to two but may be one, the catalytic unit 104 may not be connected in the upper-lower direction. Further, the connection number in the uppermost conversion part 106 may be the same as the connection number in the other conversion parts 106. For example, as shown by the double-dotted dashed line in FIG. 2, the connection number in the uppermost conversion part 106 may be three, which is the same as the connection number in the other conversion parts 106.

In this way, when the number of connected catalytic units 104 of the uppermost conversion part 106 is changeable, the capability of the catalytic reactor 10 to convert COS to $H_2S$ can be changed.

Support rings 161 may be provided at multiple positions in the height direction so that the seal plates 130 can be fixed to the support rings 161 (see FIG. 2) even if the number of connected catalytic units 104 of the uppermost conversion part 106 is changed.

In the catalytic reactor 10 according to the above-described embodiments, the opening with the maximum opening diameter is the inlet opening 151. The inlet opening 151 is disposed above the uppermost conversion part 106. Further, as described above, the diagonal dimension D3 of the catalytic unit 104 according to some embodiments is smaller than the inner diameter D2 of the inlet opening 151.

In view of this, in the catalytic reactor 10 according to some embodiments, the catalytic unit 104 is configured to be inserted into and removed from the reactor housing 101 through the inlet opening 151 at the top of the reactor housing 101 when the catalytic reactor 10 is installed or when the catalyst 102 is replaced.

As described above, in the catalytic reactor 10 according to some embodiments, a plurality of catalytic units 104 are connected in the upper-lower direction to form a connected body 105 an the diagonal dimension thereof is equal to the diagonal dimension D3 of the catalytic unit 104.

In view of this, in the catalytic reactor 10 according to some embodiments, the catalytic unit 104 is inserted into and removed from the reactor housing 101 as the connected body 105 through the inlet opening 151 at the top of the reactor housing 101 when the catalytic reactor 10 is installed or when the catalyst 102 is replaced.

(Method of Attaching/Detaching Catalytic Unit)

Hereinafter, the method of attaching/detaching, a catalytic unit according to some embodiments will be described.

The method of attaching/detaching a catalytic unit according to some embodiments includes an introduction pipe attachment/detachment step S1, a support member passing step S2, a support member attachment/detachment step S3, a connected body passing step S4, a connected body attachment/detachment step S5, a seal plate passing step S6, and a seal plate attachment/detachment step S7.

Figure 8:
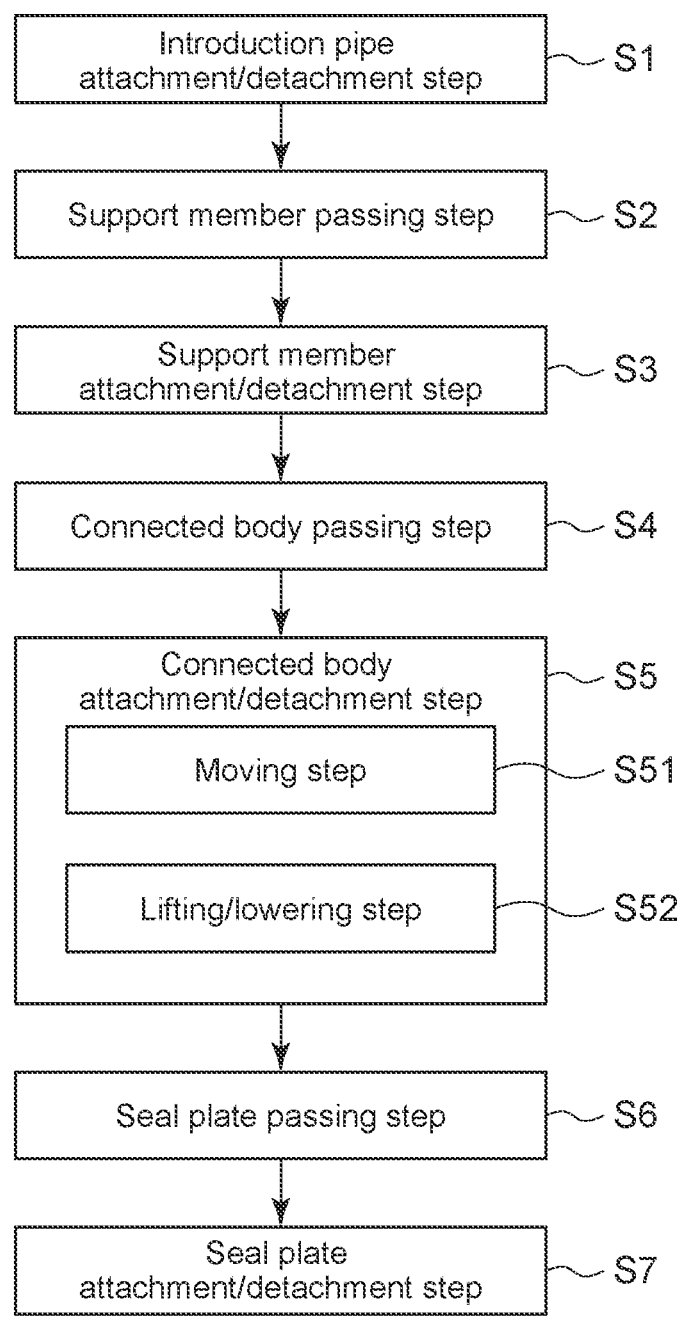
FIG. 8 is a flowchart showing the process of the method of attaching/detaching a catalytic unit according to some embodiments.

FIG. 8 is a flowchart showing the process of the method of attaching/detaching a catalytic unit according to some embodiments in the case of carrying in and attaching the catalytic unit 104 into the reactor housing 101. Although not depicted, in the case of detaching and carrying out the catalytic unit 104 from the reactor housing 101 to the outside of the reactor housing 101, the steps are performed in the reverse order to that shown in FIG. 8.

The introduction pipe attachment/detachment step S1 is a step of attaching/detaching the introduction pipe 191 and the flow straightener 152 to/from the inlet opening 151 at the top portion of the reactor housing 101. In the introduction pipe attachment/detachment step S1, the worker attaches or detaches the introduction pipe 191 and the flow straightener 152 to/from the inlet opening 151 at the top portion of the reactor housing 101. The introduction pipe 191 and the flow straightener 152 are suspended b a lifting device, such as a crane, disposed outside the reactor housing 101 and is moved between the top portion of the reactor housing 101 and the ground.

In the case of carrying in and attaching the catalytic unit 104 into the reactor housing 101, the introduction pipe attachment/detachment step S1 is a step of connecting the flow straightener 152 and the introduction pipe 191 to the inlet opening 151 at the top of the reactor housing 101.

In the case of detaching and carrying out the catalytic unit 104 from the reactor housing 101 to the outside of the reactor housing 101, the introduction pipe attachment/detachment step S1 is a step of detaching the flow straightener 152 and the introduction pipe 191 from the inlet opening 151 at the top of the reactor housing 101.

Hereinafter, a series of works of carrying in and attaching the catalytic unit 104 into the reactor housing 101 is simply referred to as carrying-in work, and a series of works of detaching and carrying out the catalytic unit 104 from the reactor housing 101 to the outside of the catalytic unit 104 is simply referred to as carrying-out work.

The support member passing step S2 is a step of passing each support member 171 through the inlet opening 151. In the support member passing step S2, the operator who operates the lifting device disposed outside the reactor housing 101 and the operator who enters the reactor housing 101 through the manhole 154 cooperate with each other to pass each support member 171 through the inlet opening 151.

In the case of carrying-in work, the support member passing step S2 is a step of carrying the support member 171 into the reactor housing 101 through the inlet opening 151. In the case of carrying-in work, in the support member passing step S2, the support member 171 is carried into the reactor housing 101 through the inlet opening 151 by using the lifting device disposed outside the reactor housing 101.

In the case of carrying-out work, the support member passing step S2 is a step of carrying the support member 171 out of the reactor housing 101 through the inlet opening 151. In the case of carrying-out work, in the support member passing step S2, the support member 171 is carried out of the reactor housing 101 through the inlet opening 151 by using the lifting device disposed outside the reactor housing 101.

The support member attachment/detachment step S3 is a step of attaching/detaching the support member 171 to a support lug 176 fixed to the inner peripheral surface 101a of the reactor housing 101. In the support member attachment/detachment step S3 the worker in the reactor housing 101 attaches or detaches the support member 171 to/from the support lug 176.

In the case of carrying-in work, the support member attachment/detachment step S3 is a step of attaching the support member 171 to the support lug 176.

In the case of carrying-out work, the support member attachment/detachment step S3 is a step of detaching the support member 171 from the support lug 176.

The connected body passing step S4 is a step of passing the connected body 105, i.e., the catalytic units 104 connected in the upper-lower direction through the inlet opening 151. In the connected body passing step S4, the operator who operates the lifting device disposed outside the reactor housing 101 and the operator in the reactor housing 101 cooperate with each other to pass the connected body 105 through the inlet opening 151.

In the case of carrying-in work, the connected body passing step S4 is a step of carrying the connected body 105 into the reactor housing 101 through the inlet opening 151. In the case of carrying-in work, in the connected body passing step S4, the connected body 105 is carried into the reactor housing 101 through the inlet opening 151 by using the lifting device disposed outside the reactor housing 101.

In the case of carrying-out work, the connected body passing step S4 is a step of carrying the connected body 105 out of the reactor housing 101 through the inlet opening 151. In the case of carrying-out work, in the connected body passing step S4, the connected body 105 is carried out of the reactor housing 101 through the inlet opening 151 by using the lifting device disposed outside the reactor housing 101.

As described above, the method of attaching/detaching a catalytic unit according to some embodiments is a method of attaching/detaching, the catalytic unit 104 accommodated in the reactor housing 101 of the catalytic reactor 10 and includes a step of passing the catalytic unit 104 through the inlet opening 151, also serving as a gas inlet, formed at the top portion of the reactor housing 101 to attach or detach the catalytic unit 104 to or from the reactor housing 101 (connected body passing step S4).

With this method of attaching/detaching a catalytic unit, since the catalytic unit 104 is passed through the inlet opening 151 formed at the top portion of the reactor housing 101, the catalytic unit 104 can be inserted to and removed from the reactor housing 101 without additionally providing an opening allowing the catalytic unit 104 to pass in the reactor housing 101. Therefore, for example like the reactor housing 101 according to some embodiments, even there is a constraint on the opening provided in the reactor housing 101 from the viewpoint of ensuring strength, the catalytic unit 104 can be inserted into and removed from the reactor housing 101.

The connected body attachment/detachment step S5 is a step of attaching/detaching the connected body 105 to/from the reactor housing 101. In the connected body attachment/detachment step S5, mainly, the worker in the reactor housing 101 attaches or detaches the connected body 105 to/from the reactor housing 101.

In the case of carrying-in work, the connected body attachment/detachment step S5 includes a moving step S51 of moving the connected body 105 positioned below the inlet opening 151 and suspended by the lifting device disposed outside the reactor housing 101 above an installation position 209 (see FIG. 9) of the connected body 105 inside the reactor housing 101, and a lifting/lowering step S52 of lowering the connected body 105 moved above the installation position 209 to be placed at the installation position 209.

In the case of carrying-out work, in the connected body attachment/detachment step S5, the connected body 105 placed in the installation position 209 is lifted in the lifting/lowering step S52, and the connected body 105 lifted above the installation position 209 is moved to a position below the inlet opening 151 in the moving step S51.

Details of the lifting/lowering step S52 and the moving step S52 will be described later.

The seal plate passing step S6 is a step of passing the seal plate 130 divided into several segments through the inlet opening 151, i.e. a step of passing each seal plate 131 to 134 in the divided state. In the seal plate passing step S6, the operator who operates the lifting device disposed outside the reactor housing 101 and the operator in the reactor housing 101 cooperate with each other to pass the divided seal plate 130 through the inlet opening 151.

In the case of carrying-in work, the seal plate passing step S6 is a step of carrying the divided seal plate 130 into the reactor housing 101 through the inlet opening 151. In the case of carrying-in work, in the seal plate passing step S6, the divided seal plate 130 is carried into the reactor housing 101 through the inlet opening 151 by using the lifting device disposed outside the reactor housing 101.

In the case of carrying-out work, the seal plate passing step S6 is a step of carrying the divided seal plate 130 out of the reactor housing 101 through the inlet opening 151. In the case of carrying-out work, in the seal plate passing step S6, the divided seal plate 130 is carried out of the reactor housing 101 through the inlet opening 151 by using the lifting device disposed outside the reactor housing 101.

In the seal plate passing step S6, a plurality of seal plates 130 may be combined into a size that allows passage through the inlet opening 151 and may be passed through the inlet opening 151.

As described above, the method of attaching/detaching a catalytic unit according to some embodiments includes a step of separately passing segments obtained by dividing the seal plate 130 through the inlet opening 151 (seal plate passing step S6).

Thus, the seal plate 130 whose size before division is larger than the size of the inlet opening 151 can be inserted and removed from the reactor housing 101.

The seal plate attachment/detachment step S7 is a step of attaching/detaching the seal plate 130 to/from the support ring 161 and the upper flange portion 116 of the casing 107 of the catalytic unit 104 or the upper flange portion 116 of the catalytic unit 104. In the seal plate attachment/detachment step S7, the worker in the reactor housing 101 attaches or detaches each seal plate 131 to 134.

In the case of carrying-in work, the seal plate attachment/detachment step S7 is a step of attaching the seal plate 130.

In the case of carrying-out work, the seal plate attachment/detachment step S7 is a step of detaching the seal plate 130.

As described above, the method of attaching/detaching a catalytic unit according to some embodiments includes a step of attaching/detaching the seal plate 130 sealing between the outer periphery of an upper portion of the casing 107 of the catalytic unit 104 and the inner periphery of the reactor housing 101 (seal plate attachment/detachment step S7).

Thus, since the seal plate 130 is also attached or detach when the catalytic unit 104 (connected body 105) is attached to or detach from the reactor housing 101, the catalytic unit 104 (connected body 105) can be easily attached or detached.

The support member passing step S2 to the seal plate attachment/detachment step S7 are performed for each of the conversion parts 106 provided in multiple stages. In the case carrying-in work, the carrying-in work is performed in order from the lowermost conversion part 106, and in the case of carrying-out work, the carrying-out work is performed in order from the uppermost conversion part 106.

(Moving Step S51)

The moving step S51 will now be described. In the following description, the moving step S51 in the carrying-in work will be mainly described. The operation performed by the moving step S51 in the carrying-out work is the same as the operation performed by the moving step S51 in the carrying-in work.

Figure 9:
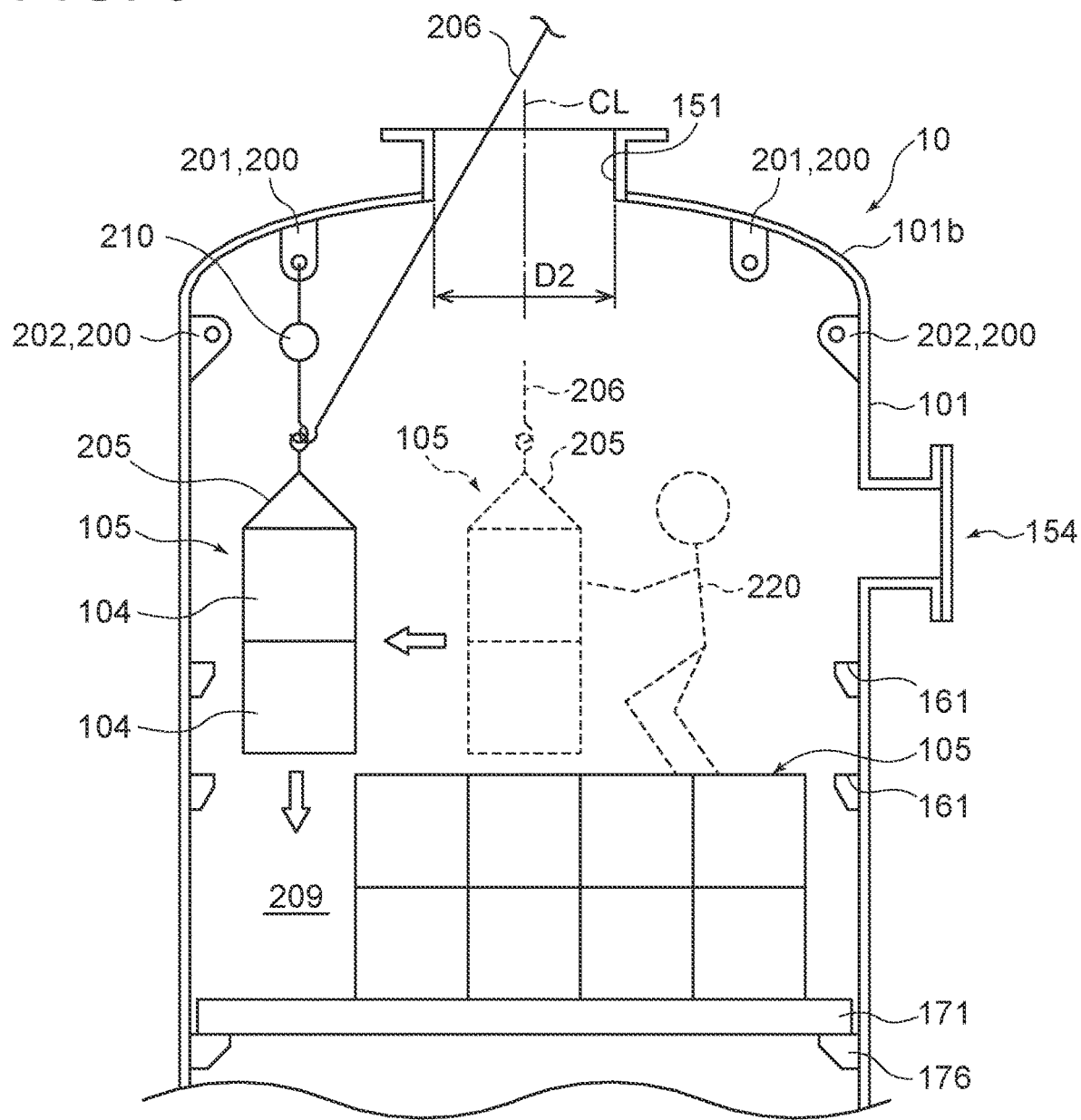
FIG. 9 is a diagram for describing the moving step and lifting/lowering step.
Figure 10:
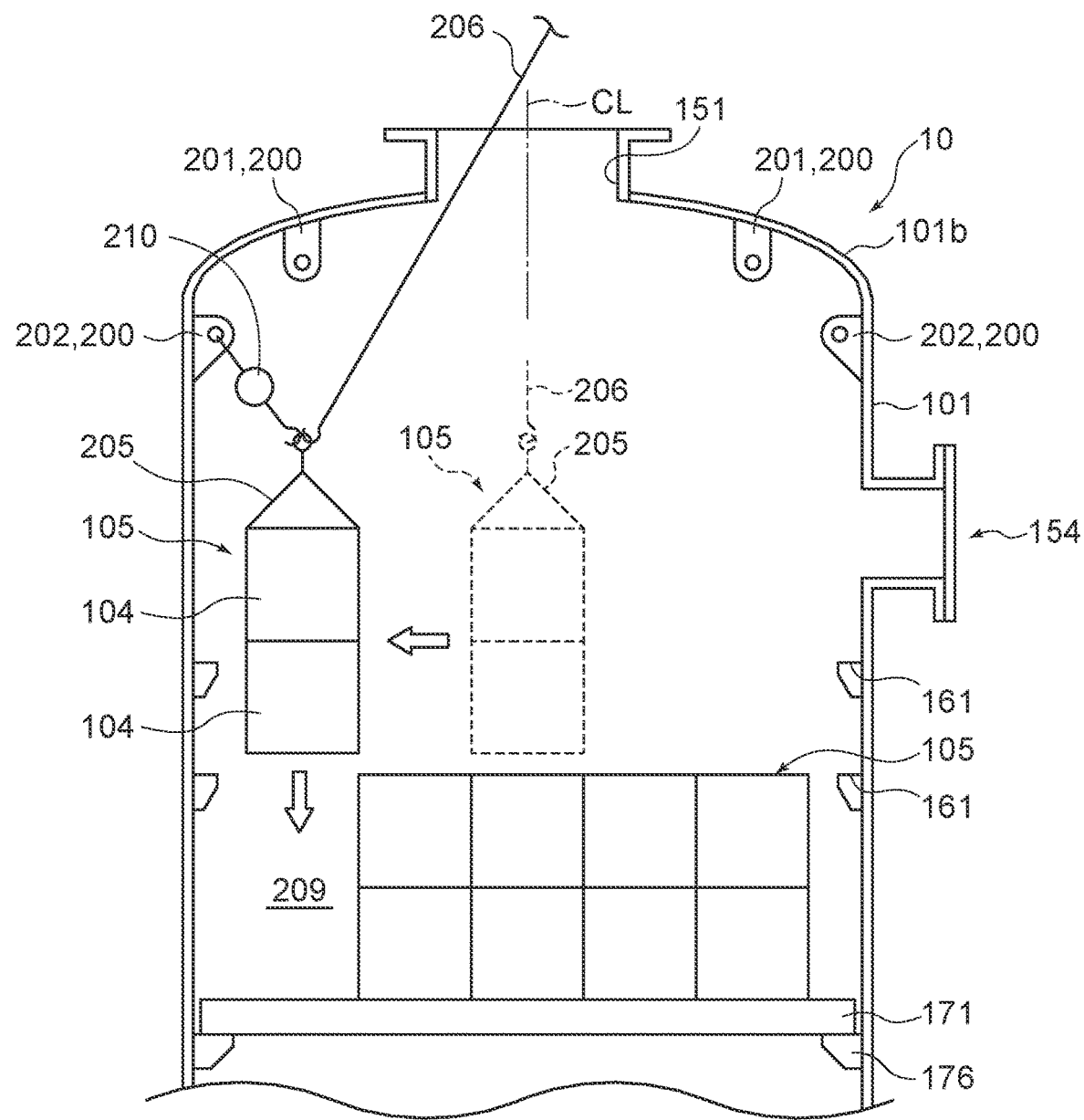
FIG. 10 is a diagram for describing the moving step and lifting/lowering step.

FIGS. 9, 10, and 11 are diagrams for describing the moving step S51 and the lifting/lowering step S52.

As shown by the dotted line in FIGS. 9 and 10, the connected body 105 is carried into the reactor housing 101, for example, while the connected body 105 is suspended by a hanging jig 205 or a sling wire 206 hung by the lifting device (not shown) disposed outside the reactor housing 101.

Although not depicted, the hanging jig 205 may be fixed to the catalytic unit 104 (connected body 105) by fastening a bolt to a nut (not shown) fixed to the log der surface of the upper flange portion 116 of the casing 107 of the catalytic unit 104.

When the connected body 105 is attached to or detached from the reactor housing 101 by inserting or removing the connected body 105 through the inlet opening 151 of the reactor housing 101, the connected body 105 is moved between the inlet opening 151 and the installation position 209 of the connected body 105 while the connected body 105 is suspended by the lifting device disposed outside the reactor housing 101. In this case, if the position of the inlet opening 151 and the installation position 209 of the connected body 105 to be attached or detached are displaced in the radial direction of the reactor housing 101, it is necessary to move the connected body 105 inside the reactor housing 101 in the radial direction of the reactor housing 101, i.e., in the horizontal direction.

In the carrying-in work, if the installation position 209 of the connected body 105 inside the reactor housing 101 is vertically below the inlet opening 151 or in the vicinity thereof, by appropriately adjusting the horizontal position of the connected body 105 suspended in the reactor housing 101 by the worker in the reactor housing 101, the connected body 105 can be moved vertically above the installation position 209.

However, it becomes more difficult to adjust the horizontal position of the connected body 105 suspended in the reactor housing 101 as the installation position 209 is located more outward in the radial direction of the reactor housing 101. In particular, this tendency is remarkable as the position of the conversion part 106 rises.

Therefore, in the moving step S51 according to some embodiments, the connected body 105 is moved by using a hoisting device 210 suspended from the hanger 200 disposed inside the catalytic reactor 10.

Thus, the connected body 105 can be easily moved in the reactor housing 101, so that the attachment and detachment of the connected body 105 can be efficiently performed.

The hoisting device 210 used here may be any hoisting device such as a chain block, a lever hoist, or an electric hoist.

In the moving step S51 according to some embodiments, specifically, the connected body 105 suspended by the external lifting device which lifts and lowers the connected body 105 from the outside of the reactor housing 101 is moved in the radial direction of the reactor housing 101 by using the hoisting device 210 suspended from the hanger 200 that is disposed outward of the inlet opening 151 in the radial direction of the reactor housing 101.

Thus, even if the position of the inlet opening 151 formed at the top portion of the reactor housing 101 is displaced from the installation position 209 of the connected body 105 to be attached or detached in the radial direction, by using the hoisting device 210 suspended from the hanger 200 disposed outward of the inlet opening 151 in the radial direction of the reactor housing 101, the connected body 105 can be easily moved in the radial direction of the reactor housing 101. Thus, the attachment and detachment of the connected body 105 can be efficiently performed.

In the moving step S51 according to some embodiments, in the case of carrying-in work, the connected body 105 is moved radially outward from a position vertically below the inlet opening 151 by operating the external lifting device and the hoisting device 210 in conjunction with each other.

Thus, by operating the external lifting device and the hoisting device 210 suspended from the hanger 200 inside the reactor housing 101 in conjunction with each other, the connected body 105 can be easily moved in the radial direction of the reactor housing 101. Thus, the attachment and detachment of the connected body 105 can be efficiently performed.

The catalytic reactor 10 according to the embodiments described above includes the hanger 200 disposed in the reactor housing 101, above the catalytic unit 104, and outward of the inlet opening 151 in the radial direction of the reactor housing 101.

Thus, by suspending the hoisting device 210 such as a chain block from the hanger 200 and using this hoisting device 210, the connected body 105 can be easily moved in the radial direction of the reactor housing 101, Thus, the attachment and detachment of the connected body 105 can be efficiently performed.

In the catalytic reactor 10 according to some embodiments, the hanger 200 is disposed at the top portion of the reactor housing 101 and at the peripheral wall (inner peripheral surface 101a) of the reactor housing 101.

The installation position of the first hanger 201 disposed at the top portion of the reactor housing 101 and the installation position of the second hanger 202 disposed at the peripheral wall of the reactor housing 101 are different in the radial direction of the reactor housing 101. By appropriately using the hangers 201, 202 disposed at different positions in the radial direction of the reactor housing 101, the connected body 105 can be easily moved in the radial direction of the reactor housing 101. Thus, the attachment and detachment of the connected body 105 can be efficiently performed.

For example, as shown in HG, 9, the connected body 105 suspended by the external lifting device may be moved in the radial direction of the reactor housing 101 by using the hoisting device 210 suspended from the first hanger 201. For example, as shown in FIG. 10, the connected body 105 suspended by the external lifting device may be moved in the radial direction of the reactor housing 101 by using the hoisting device 210 suspended from the second hanger 202.

Further, for example, as shown in FIG. 11, the connected body 105 may be moved in the radial direction of the reactor housing 101 by using the hoisting device 210 suspended from the first hanger 201 and the hoisting device 210 suspended from the second hanger 202.

(Lifting/Lowering Step S52)

The lifting/lowering step S52 will now be described. In the following description, the lifting/lowering step S52 in the carrying-in work will be mainly described. The operation performed by the lifting/lowering step S52 in the carrying-out work is the same as the operation performed by the lifting/lowering step S52 in the carrying-in work.

In the lifting/lowering step S52, the connected body 105 positioned vertically above the installation position 209 by the moving step S51 is lowered to place the connected body 105 on the support member 171.

For example, as shown in FIGS. 9 and 10, when the connected body 105 is suspended by the external lifting device and the hoisting device 210, the connected body 105 is lowered by operating the external lifting device and the hoisting device 210 in cooperation.

If the hanger 200 is disposed substantially vertically above the installation position 209 as shown in FIG. 9 for example, the connected body 105 may be lowered by using only the hoisting device 210 suspended from the hanger 200.

Further, for example, as shown in FIG. 11, when the connected body 105 is suspended by two hoisting devices 210, the connected body 105 is lowered by operating the two hoisting devices 210 in cooperation.

The present invention is not limited to the embodiments described above, but includes modifications to the embodiments described above, and embodiments composed of combinations of those embodiments.

For example, in the above-described embodiments, about 2 to 4 Mpa of gauge pressure acts on the catalytic reactor 10 as internal pressure. Therefore, the catalytic reactor 10 according to some embodiments is used while about 2 to 4 Mpa of gauge pressure acts thereon as internal pressure. However, the method of attaching/detaching a catalytic unit according to at least one embodiment of the present invention may be applied to the method of inserting and removing a catalytic unit into/from the container when there is a constraint on the opening provided in the container from the viewpoint of ensuring strength, for example like the reactor housing configured so that a gas having a gauge pressure of 0.2 MPa or more is introduced thereto.

In the above-described embodiments, the shape of the catalytic unit 104 viewed in the upper-lower direction is rectangular. However, the shape of the catalytic unit 104 viewed in the upper-lower direction may be a polygonal shape other than the rectangular shape. In other words, the catalytic unit 104 may have a polygonal prism shape other than the quadrangular prism shape. For example, the catalytic unit 104 may have a triangular prism shape or a hexagonal prism shape. Alternatively, the shape of the catalytic unit 104 viewed in the upper-lower direction may be a circular shape or an elliptical shape. In other words, the catalytic unit 104 may have a cylindrical shape or an elliptic cylindrical shape.

Although in the above-described embodiments, the conversion part 106 includes a plurality of connected bodies 105, the number of connected bodies 105 included in one conversion part 106 is at least one.

REFERENCE SIGNS LIST

10 Catalytic reactor
101 Reactor housing
102 Catalyst
104 Catalytic unit
105 Connected body
106 Conversion part
107 Casing
130 Seal plate
151 Inlet (Inlet opening)
152 How straightener
153 Outlet (Outlet opening)
154 Manhole
171 Support member
191 Introduction pipe
200 Hanger
201 First hanger
202 Second hanger
210 Hoisting device

The invention claimed is:

1. A catalytic reactor, comprising:
a plurality of catalytic units;
a reactor housing having a cylindrical shape extending in a vertical direction, the reactor housing being configured such that a gas having a gauge pressure of 0.2 MPa or more is introduced into the reactor housing, the reactor housing having an inlet for the gas at a top portion, the reactor housing accommodating the catalytic units; and
one or more hanging metal fittings disposed, inside the reactor housing, above the catalytic units, and radially outward of the inlet in a radial direction of the reactor housing,
wherein
each hanging metal fitting, of the one or more hanging metal fittings, is:
   disposed at the top portion of the reactor housing or at a peripheral wall of the reactor housing; and
   separated from an upper surface of an uppermost catalytic unit, among the plurality of catalytic units, in the vertical direction of the reactor housing.

* * * * *